US012560325B2

(12) United States Patent
Moura et al.

(10) Patent No.: US 12,560,325 B2
(45) Date of Patent: Feb. 24, 2026

(54) APPARATUS AND METHOD FOR MITIGATING PARTICULATE ACCUMULATION ON A COMPONENT OF A GAS TURBINE ENGINE

(71) Applicant: RTX Corporation, Farmington, CT (US)

(72) Inventors: Dennis M. Moura, South Windsor, CT (US); Carey Clum, East Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 617 days.

(21) Appl. No.: 16/211,805

(22) Filed: Dec. 6, 2018

(65) Prior Publication Data

US 2019/0186740 A1 Jun. 20, 2019

Related U.S. Application Data

(60) Provisional application No. 62/607,609, filed on Dec. 19, 2017.

(51) Int. Cl.
*F23R 3/06* (2006.01)
*F23R 3/00* (2006.01)

(52) U.S. Cl.
CPC ................ *F23R 3/06* (2013.01); *F23R 3/002* (2013.01); *F05D 2260/201* (2013.01); (Continued)

(58) Field of Classification Search
CPC .... F23R 3/002; F23R 3/02; F23R 3/04; F23R 3/06; F23R 2900/00004; (Continued)

(56) References Cited

U.S. PATENT DOCUMENTS 5,353,865 A * 10/1994 Adiutori ................ F28F 13/02 165/133
6,439,846 B1 8/2002 Anderson et al.
(Continued)

FOREIGN PATENT DOCUMENTS

| | | | |
|---|---|---|---|
| CN | 107449308 | A | 12/2017 |
| EP | 3032175 | A1 | 6/2016 |
| JP | 2016189414 | A | 11/2016 |

(Continued)

OTHER PUBLICATIONS

The Extended European Search Report for Application No. 18214246.3-1009; Report Issued Date: Mar. 27, 2019; Report Received Date: Mar. 26, 2019; 29 pages.

*Primary Examiner* — Devon C Kramer
(74) *Attorney, Agent, or Firm* — CANTOR COLBURN LLP

(57) ABSTRACT

A gas turbine engine component assembly comprising: a first component having a first surface, a second surface opposite the first surface, and a plurality of cooling holes extending from the second surface to the first surface; a second component having a first surface and a second surface, the first surface of the first component and the second surface of the second component defining a cooling channel therebetween in fluid communication with the cooling hole for cooling the second surface of the second component; and a plurality of dimples located on the second surface of the second component, the plurality of dimples including: a plurality of primary dimples, wherein each of the plurality of primary dimples is located at an impingement point on the second surface of the second component; and a plurality of secondary dimples, each of the plurality of secondary dimples is located at an impingement flow convergence point.

10 Claims, 5 Drawing Sheets

(52) U.S. Cl.

CPC .. *F05D 2260/202* (2013.01); *F05D 2260/205* (2013.01); *F05D 2260/221* (2013.01); *F05D 2260/607* (2013.01); *F23R 2900/00004* (2013.01); *F23R 2900/03043* (2013.01); *F23R 2900/03044* (2013.01); *F23R 2900/03045* (2013.01)

(58) Field of Classification Search

CPC .. F23R 2900/03042; F23R 2900/03044; F05D 2240/35; F05D 2260/201; F05D 2260/202; F05D 2260/203; F05D 2260/204; F05D 2260/205; F05D 2260/221; F05D 2260/2212; F05D 2260/2214; F05D 2260/22141; F05D 2260/231; F05D 2260/232; F05D 2260/607; F02C 7/05; F02C 7/052

See application file for complete search history.

(56) References Cited

U.S. PATENT DOCUMENTS

| | | | | |
|---|---|---|---|---|
| 8,099,961 | B2 * | 1/2012 | Gerendas | F23R 3/007 60/752 |
| 10,508,808 | B2 * | 12/2019 | Drake | F23R 3/50 |
| 10,641,099 | B1 * | 5/2020 | Waite | F01D 5/187 |
| 2005/0150632 | A1 * | 7/2005 | Mayer | F01D 25/08 165/47 |
| 2016/0238249 | A1 * | 8/2016 | Cunha | F23R 3/005 |
| 2017/0101894 | A1 | 4/2017 | Preethi et al. | |
| 2017/0101932 | A1 | 4/2017 | Stover et al. | |
| 2017/0191417 | A1 | 7/2017 | Bumker et al. | |

FOREIGN PATENT DOCUMENTS

| | | | |
|---|---|---|---|
| WO | 2015023339 | A2 | 2/2015 |
| WO | 2016069599 | A1 | 5/2016 |

* cited by examiner

APPARATUS AND METHOD FOR MITIGATING PARTICULATE ACCUMULATION ON A COMPONENT OF A GAS TURBINE ENGINE

CROSS-REFERENCE TO RELATED APPLICATIONS

This application claims the benefit of U.S. Provisional Application No. 62/607,609 filed Dec. 19, 2017, which is incorporated herein by reference in its entirety.

BACKGROUND

The subject matter disclosed herein generally relates to gas turbine engines and, more particularly, to method and apparatus for mitigating particulate accumulation on cooling surfaces of components of gas turbine engines.

In one example, a combustor of a gas turbine engine may be configured and required to burn fuel in a minimum volume. Such configurations may place substantial heat load on the structure of the combustor (e.g., panels, shell, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields or panels. Particulates in the air used to cool these structures may inhibit cooling of the heat shield and reduce durability. Particulates, in particular atmospheric particulates, include solid or liquid matter suspended in the atmosphere such as dust, ice, ash, sand and dirt.

SUMMARY

According to one embodiment, a gas turbine engine component assembly is provided. The gas turbine engine component assembly comprising: a first component having a first surface, a second surface opposite the first surface, and a plurality of cooling holes extending from the second surface to the first surface through the first component; a second component having a first surface and a second surface, the first surface of the first component and the second surface of the second component defining a cooling channel therebetween in fluid communication with the cooling hole for cooling the second surface of the second component; and a plurality of dimples located on the second surface of the second component, the plurality of dimples including: a plurality of primary dimples, wherein each of the plurality of primary dimples is located at an impingement point on the second surface of the second component; and a plurality of secondary dimples, each of the plurality of secondary dimples is located at an impingement flow convergence point.

In addition to one or more of the features described above, or as an alternative, further embodiments may include that each impingement point on the second surface of the second component is located opposite a cooling hole of the plurality of cooling holes.

In addition to one or more of the features described above, or as an alternative, further embodiments may include that the second component includes a plurality of secondary cooling holes extending from the second surface to the first surface.

In addition to one or more of the features described above, or as an alternative, further embodiments may include that each of the plurality of secondary cooling holes is located between a primary dimple at an impingements point and a secondary dimple at an impingement flow convergence point.

In addition to one or more of the features described above, or as an alternative, further embodiments may include that each of the plurality of dimples has a rounded shape.

In addition to one or more of the features described above, or as an alternative, further embodiments may include that each of the plurality of dimples has a hemispherical shape.

In addition to one or more of the features described above, or as an alternative, further embodiments may include that each of the plurality of dimples has a symmetrical hemispherical shape.

In addition to one or more of the features described above, or as an alternative, further embodiments may include that each of the plurality of dimples has a non-symmetrical hemispherical shape.

In addition to one or more of the features described above, or as an alternative, further embodiments may include that each impingement flow convergence point is located equally between two or more impingement points.

In addition to one or more of the features described above, or as an alternative, further embodiments may include that a height of each of the plurality of the secondary dimple is greater than a height of each of the plurality of primary dimples.

According to another embodiment, a shell of a combustor for use in a gas turbine engine is provided. The shell comprising: a combustion chamber of the combustor, the combustion chamber having a combustion area; a combustion liner having an inner surface, an outer surface opposite the inner surface, and a plurality of primary apertures extending from the outer surface to the inner surface through the combustion liner; a heat shield panel interposed between the inner surface the combustion liner and a combustion area, the heat shield panel having a first surface and a second surface opposite the first surface, wherein the second surface is oriented towards the inner surface, and wherein the heat shield panel is separated from the combustion liner by an impingement cavity; and a plurality of dimples located on the second surface, the plurality of dimples including: a plurality of primary dimples, wherein each of the plurality of primary dimples is located at an impingement point on the second surface; and a plurality of secondary dimples, each of the plurality of secondary dimples is located at an impingement flow convergence point.

In addition to one or more of the features described above, or as an alternative, further embodiments may include that each impingement point on the second surface of the heat shield heat shield panel is located opposite one of the plurality of primary apertures.

In addition to one or more of the features described above, or as an alternative, further embodiments may include that each of the heat shield heat shield panels includes a plurality of secondary apertures extending from the second surface to the first surface.

In addition to one or more of the features described above, or as an alternative, further embodiments may include that each of the plurality of secondary apertures is located between a primary dimple at an impingements point and a secondary dimple at an impingement flow convergence point.

In addition to one or more of the features described above, or as an alternative, further embodiments may include that each of the plurality of dimples has a rounded shape.

In addition to one or more of the features described above, or as an alternative, further embodiments may include that each of the plurality of dimples has a hemispherical shape.

In addition to one or more of the features described above, or as an alternative, further embodiments may include that each of the plurality of dimples has a symmetrical hemispherical shape.

In addition to one or more of the features described above, or as an alternative, further embodiments may include that each of the plurality of dimples has a non-symmetrical hemispherical shape.

In addition to one or more of the features described above, or as an alternative, further embodiments may include that each impingement flow convergence point is located equally between two or more impingement points.

In addition to one or more of the features described above, or as an alternative, further embodiments may include that a height of each of the plurality of the secondary dimple is greater than a height of each of the plurality of primary dimples.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

Figure 3A:
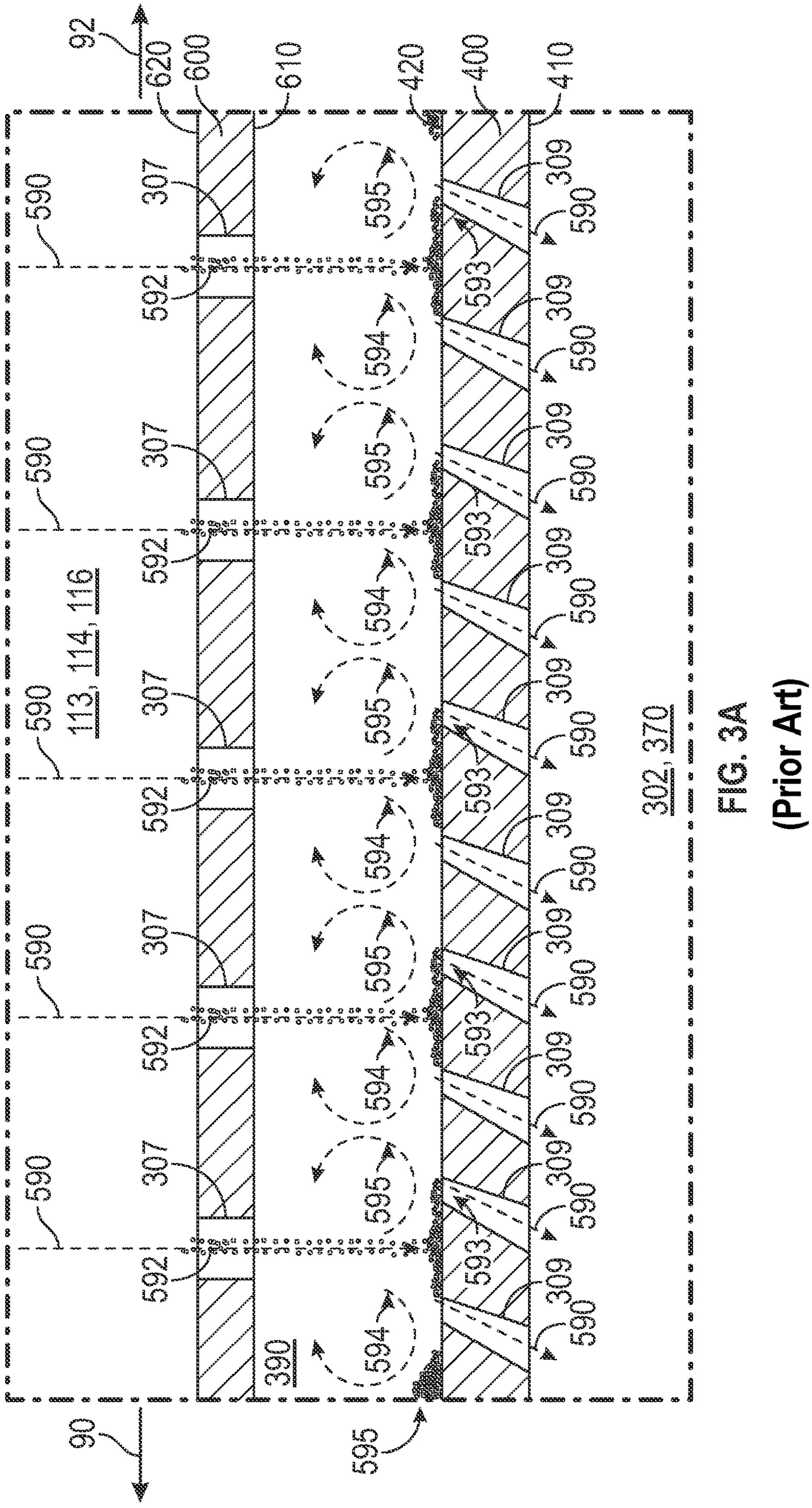
FIG. 3A (Prior Art)
Figure 3B:
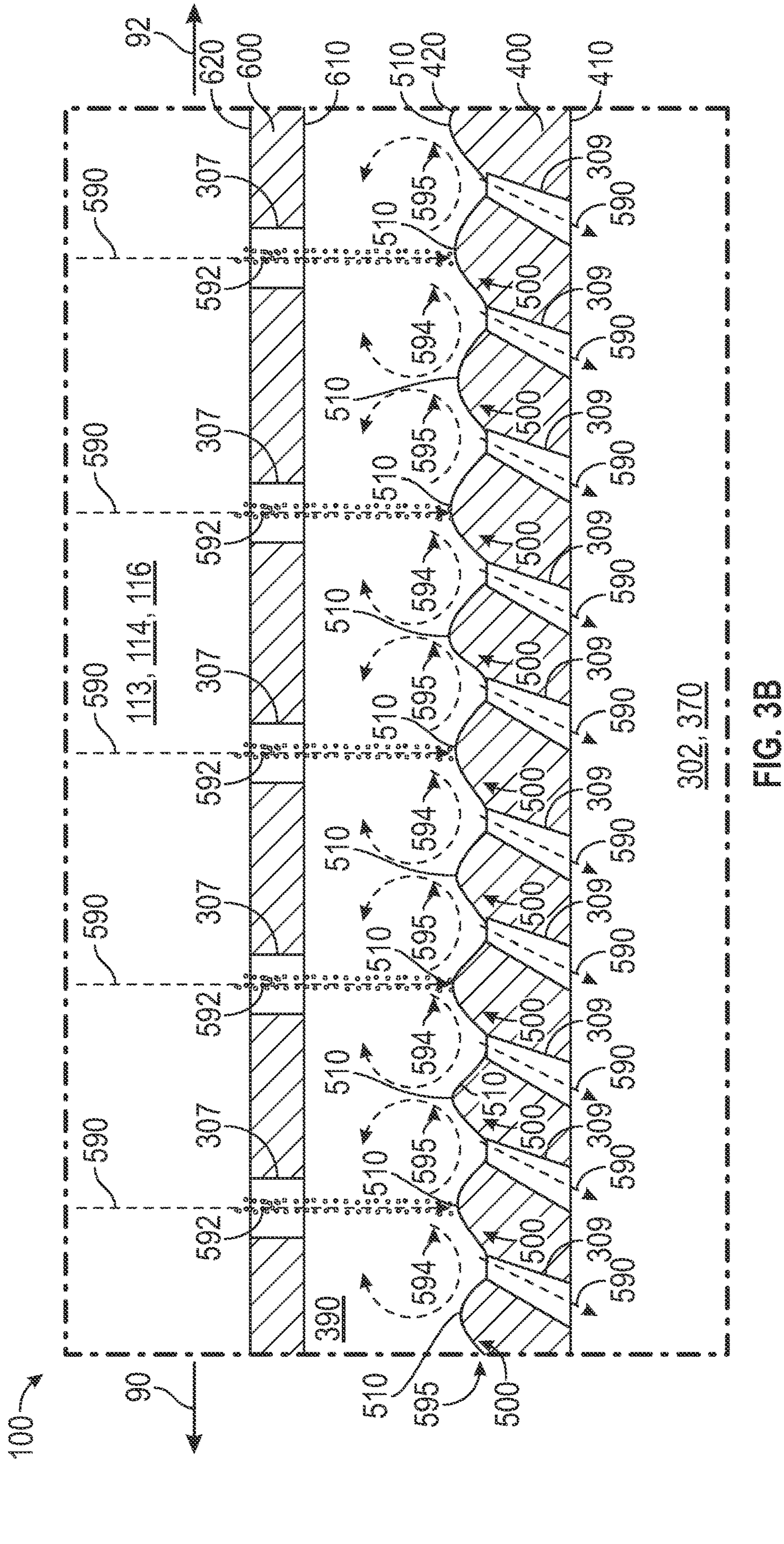
Figure 3C:
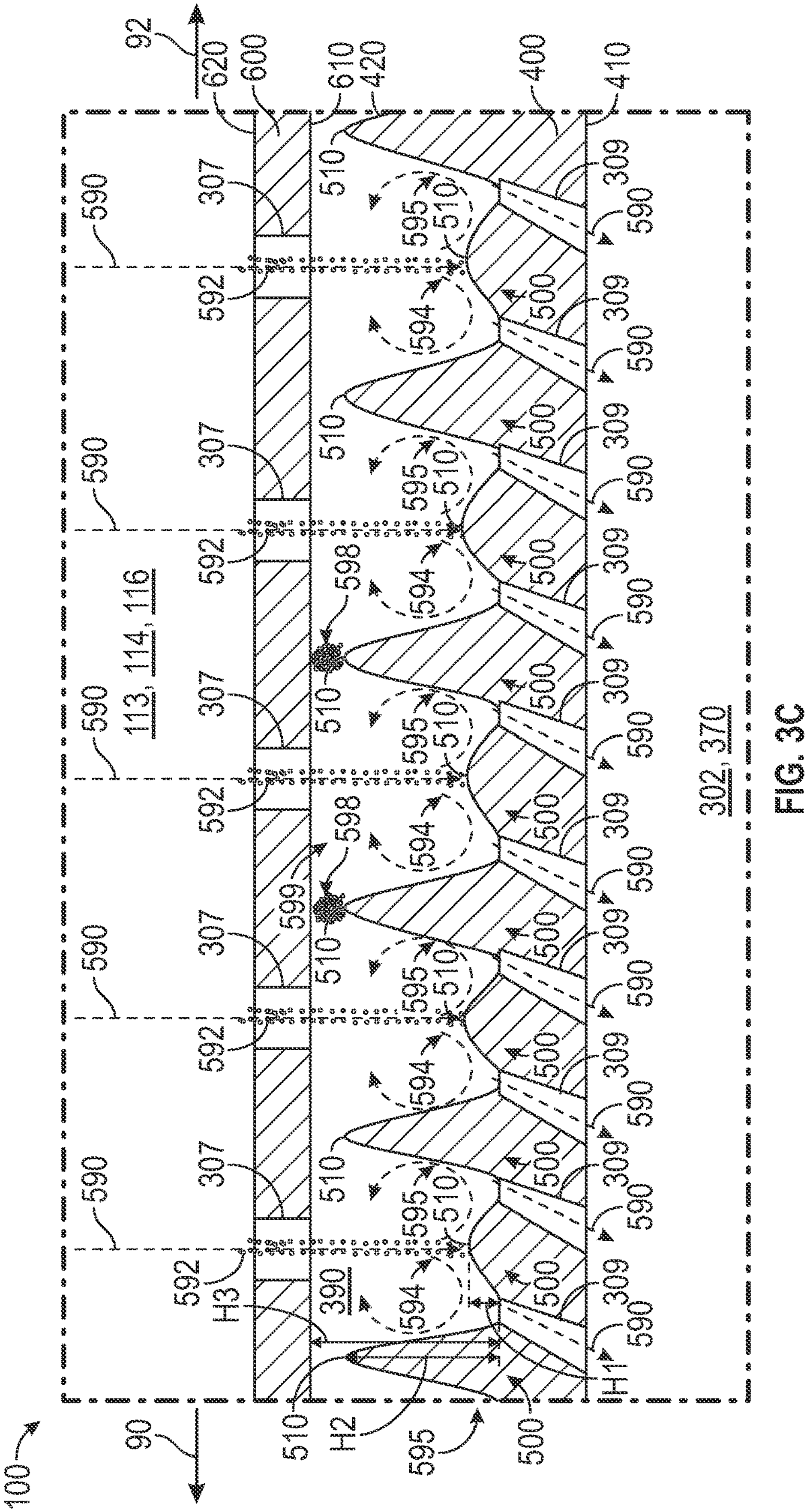

FIG. 3*a* is an enlarged cross-sectional illustration of a heat shield panel and combustion liner of a combustor, in accordance with an embodiment of the disclosure;

FIG. 3*b* is a cross-sectional illustration of a particulate collection mitigation system for a combustor of a gas turbine engine, in accordance with an embodiment of the disclosure; and FIG. 3*c* is a cross-sectional illustration of a particulate collection mitigation system for a combustor of a gas turbine engine, in accordance with an embodiment of the disclosure.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines, as well as other components, experience elevated heat levels during operation. Impingement and convective cooling of panels of the combustor wall may be used to help cool the combustor. Convective cooling may be achieved by air that is channeled between the panels and a liner of the combustor. Impingement cooling may be a process of directing relatively cool air from a location exterior to the combustor toward a back or underside of the panels.

Thus, combustion liners and heat shield panels are utilized to face the hot products of combustion within a combustion chamber and protect the overall combustor shell. The combustion liners may be supplied with cooling air including dilution passages which deliver a high volume of cooling air into a hot flow path. The cooling air may be air from the compressor of the gas turbine engine. The cooling air may impinge upon a back side of a heat shield panel that faces a combustion liner inside the combustor. The cooling air may contain particulates, which may build up on the heat shield panels overtime, thus reducing the cooling ability of the cooling air. Embodiments disclosed herein seek to address particulate adherence to the heat shield panels in order to maintain the cooling ability of the cooling air.

Figure 1:
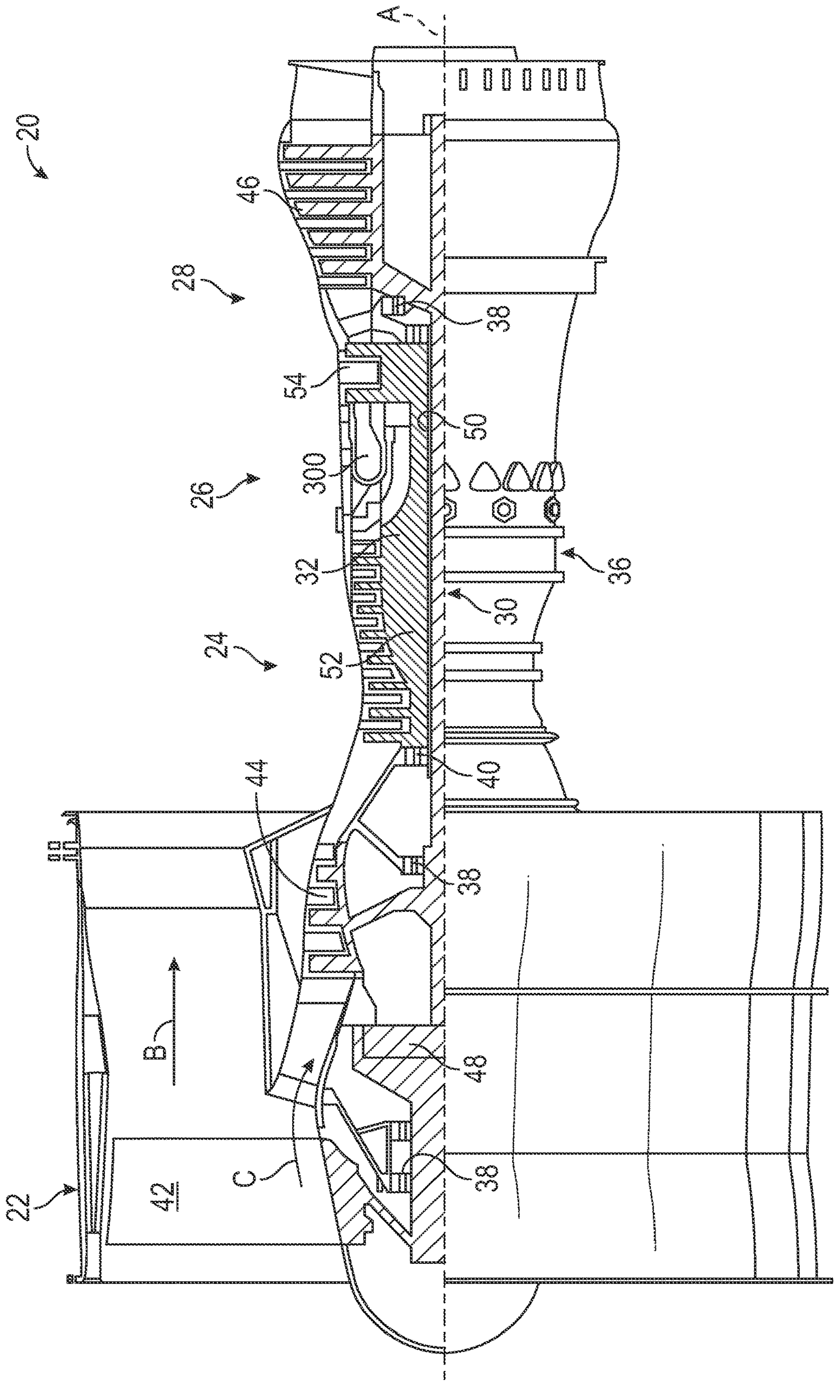
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as “bucket cruise Thrust Specific Fuel Consumption (‘TSFC’)”—is the industry standard parameter of 1 bm of fuel being burned divided by 1 bf of thrust the engine produces at that minimum point. “Low fan pressure ratio” is the pressure ratio across the fan blade alone, without a Fan Exit Guide Vane (“FEGV”) system. The low fan pressure ratio as disclosed herein according to one non-limiting embodiment is less than about 1.45. “Low corrected fan tip speed” is the actual fan tip speed in ft/sec divided by an industry standard temperature correction of $[(\text{Tram } ^\circ \text{ R})/(518.7^\circ \text{ R})]^{0.5}$. The “Low corrected fan tip speed” as disclosed herein according to one non-limiting embodiment is less than about 1150 ft/second (350.5 m/sec).

Figure 2:
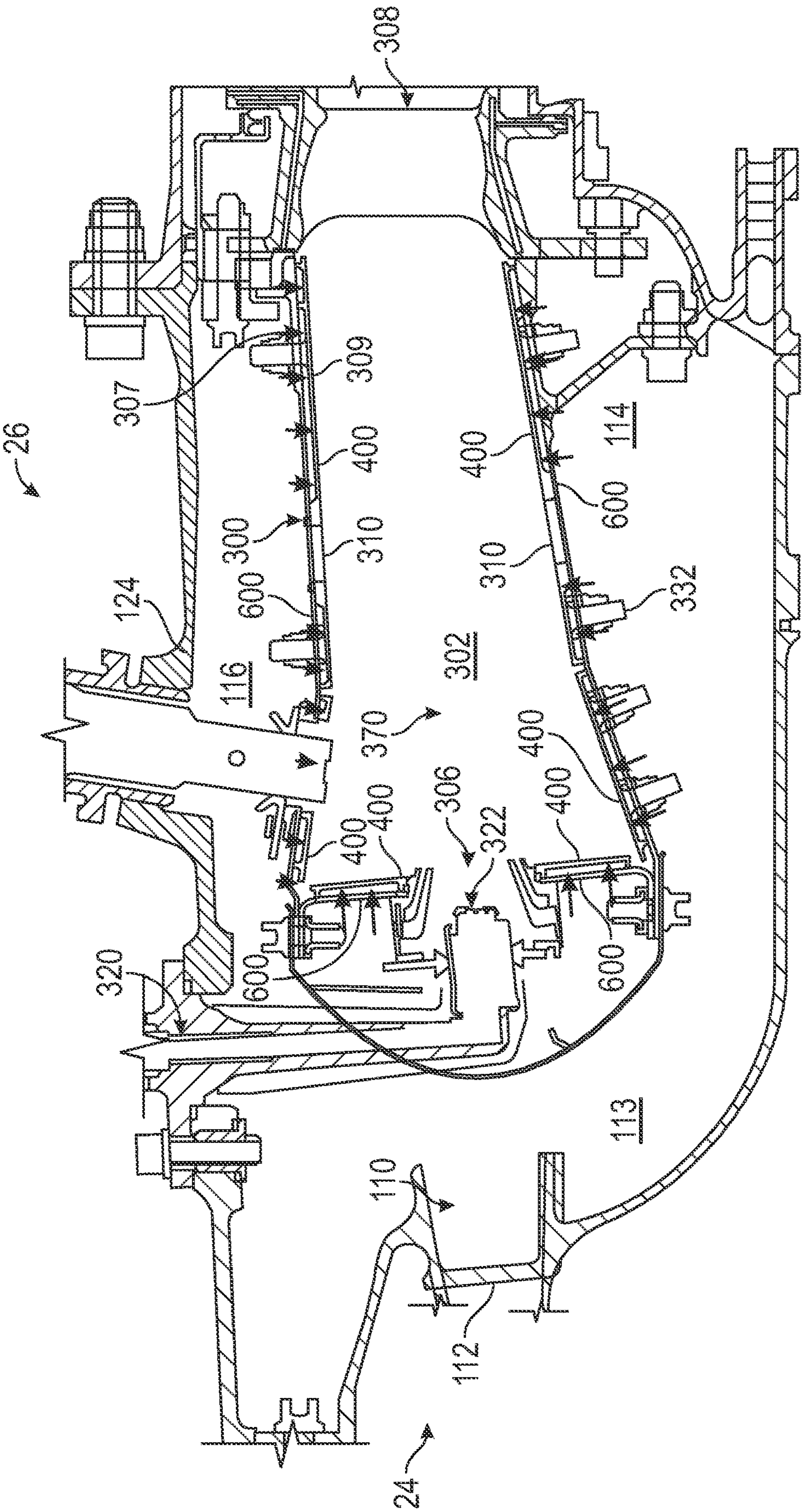
FIG. 2 is a cross-sectional illustration of a combustor, in accordance with an embodiment of the disclosure.

Referring now to FIG. 2 and with continued reference to FIG. 1, the combustor section 26 of the gas turbine engine 20. As illustrated in FIG. 2, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion area 370 of the combustion chamber 302 through other holes in the combustor 300 including but not limited to quench holes 310, as seen in FIG. 2.

As shown in FIG. 2, compressor air is supplied from a compressor section 24 into a pre-diffuser strut 112. As will be appreciated by those of skill in the art, the pre-diffuser strut 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113 a portion of the air may flow into the combustor inlet 306, a portion may flow into the inner diameter branch 114, and a portion may flow into the outer diameter branch 116.

The air from the inner diameter branch 114 and the outer diameter branch 116 may then enter the combustion area 370 of the combustion chamber 302 by means of one or more primary apertures 307 in the combustion liner 600 and one or more secondary apertures 309 in the heat shield panels 400. The primary apertures 307 and secondary apertures 309 may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion area 370 of the combustion chamber 302. The combustor 300 of the engine combustion section 26 may be housed within a shroud case 124 which may define the shroud chamber 113.

The combustor 300, as shown in FIG. 2, includes multiple heat shield panels 400 that are attached to the combustion liner 600 (See FIG. 3*a*). The heat shield panels 400 are arranged parallel to the combustion liner 600. The combustion liner 600 can define circular or annular structures with the heat shield panels 400 being mounted on a radially inward liner and a radially outward liner, as will be appreciated by those of skill in the art. The heat shield panels 400 can be removably mounted to the combustion liner 600 by one or more attachment mechanisms 332. In some embodiments, the attachment mechanism 332 may be integrally formed with a respective heat shield panel 400, although other configurations are possible. In some embodiments, the attachment mechanism 332 may be a bolt or other structure that may extend from the respective heat shield panel 400 through the interior surface to a receiving portion or aperture of the combustion liner 600 such that the heat shield panel 400 may be attached to the combustion liner 600 and held in place. The heat shield panels 400 partial enclose a combustion area 370 within the combustion chamber 302 of the combustor 300.

Referring now to FIGS. 3*a*, 3*b* and 3*c* with continued reference to FIGS. 1 and 2. FIG. 3*a* illustrates a heat shield panel 400 and a combustion liner 600 of a combustor 300 (see FIG. 1) of a gas turbine engine 20 (see FIG. 1). The heat shield panel 400 and the combustion liner 600 are in a facing spaced relationship. FIG. 3*b* shows a particulate collection mitigation system 100 for a combustor 300 (see FIG. 1) of a gas turbine engine 20 (see FIG. 1), in accordance with an embodiment of the present disclosure. The heat shield panel 400 includes a first surface 410 oriented towards the combustion area 370 of the combustion chamber 302 and a second surface 420 first surface opposite the first surface 410 oriented towards the combustion liner 600. The combustion liner 600 has an inner surface 610 and an outer surface 620 opposite the inner surface 610. The inner surface 610 is oriented toward the heat shield panel 400. The outer surface 620 is oriented outward from the combustor 300 proximate the inner diameter branch 114 and the outer diameter branch 116.

The combustion liner 600 includes a plurality of primary apertures 307 configured to allow airflow 590 from the inner diameter branch 114 and the outer diameter branch 116 to enter an impingement cavity 390 in between the combustion liner 600 and the heat shield panel 400. Each of the primary apertures 307 extend from the outer surface 620 to the inner surface 610 through the combustion liner 600. Each of the primary apertures 307 fluidly connects the impingement cavity 390 to at least one of the inner diameter branch 114 and the outer diameter branch 116.

The heat shield panel 400 may include one or more secondary apertures 309 configured to allow airflow 590 from the impingement cavity 390 to the combustion area 370 of the combustion chamber 302. Each of the secondary apertures 309 extend from the second surface 420 to the first surface 410 through heat shield panel 400. Airflow 590 flowing into the impingement cavity 390 impinges on the second surface 420 of the heat shield panel 400 at an impingement point 594 and absorbs heat from the heat shield panel 400 as it impinges on the second surface 420. As seen in FIG. 3*a*, particulate 592 may accompany the airflow 590 flowing into the impingement cavity 390. Particulate 592 may include but are not limited to dirt, smoke, soot, volcanic ash, or similar airborne particulate known to one of skill in the art. As the airflow 590 and particulate 592 impinge upon the second surface 420 of the heat shield panel 400, the particulate 592 may begin to collect on the second surface 420, as seen in FIG. 3*a*. Particulate 592 collecting upon the second surface 420 of the heat shield panel 400 reduces the cooling efficiency of airflow 590 impinging upon the second surface 420, thus may increase local temperatures of the heat shield panel 400 and the combustion liner 600. Particulate 592 collecting upon the second surface 420 of the heat shield panel 400 may potentially create a blockage 593 to the secondary apertures 309 in the heat shield panels 400, thus reducing airflow 590 into the combustion area 370 of the combustion chamber 302. The blockage 593 may be a partial blockage or a full blockage.

Particulate 592 tends to collect at various collection points along second surface 420 of the heat shield panel 400. The collection points may include impingement points 594 and impingement flow convergence point 595. Impingement points 594 are points on the second surface 420 of the heat shield panel 400 where the airflow 590 and particulate 592 from a first primary aperture 307 is directed to impinge upon the second surface of the heat shield panel. Thus, each impingement points 594 is located opposite a primary aperture 307. When the airflow 590 and particulate 592 hit the second surface 594, the airflow and particulate 592 are forced to change direction abruptly, thus resulting in a loss of speed. The direction change will be either in a first direction 90 or a second direction 92. This direction change and loss of speed will result in some particulate 592 being separated from the airflow 590 and the particulates 590 that are separated will collect at the impingement point 594, as seen in FIG. 3*b*. The particulate 592 that does not collect at the impingement point 594 will be directed along with the airflow 592 either in a first direction 90 or a second direction 92 until the particulate 592 and airflow 590 converges at an impingement flow convergence point 595 with the particulate 592 and airflow 590 from a second primary aperture 307 adjacent to the first primary aperture 307, as seen in FIG. 3*b*. Each impingement flow convergence point 595 may be located about equally between two or more impingement points 594, as seen in FIG. 3*a*. At an impingement flow convergence point 595, the converging particulate 592 and airflow 590 is forced to change direction abruptly for a second time, thus resulting in a loss of speed. The second direction change will be towards the combustion liner 600. This second direction change and loss of speed will result in some particulate 592 being separated from the airflow 590 and the particulates 590 separated will collect at the impingement flow convergence point 595, as seen in FIG. 3*b*.

The combustion liner 600 may include one or more raised bumps or dimples 500, as seen in FIG. 3*b*. The dimples 500 may be attached to the second surface 410 of the heat shield panel 400 or formed on the second surface 420 of the heat shield panel 400. Advantageously, the addition of one or more dimples 500 to the second surface of the heat-shield panels 400 may help reduce collection of particulates 592 at the impingement points 594 and the impingement flow convergence points 595 on the second surface 420. The dimples 500 located at the impingement points 594 may be referred to as primary dimples and the dimples 500 located at the impingement flow convergence points 595 may be referred to as secondary dimples. In an embodiment, the dimples 500 are rounded. In another embodiment, the dimples 500 may each be hemispherical in shape, as seen in FIG. 3*b*. The hemispherical shape of the dimple 500 may be symmetrical or non-symmetrical. In a symmetrical hemispherically shaped dimple 500, airflow 590 and particulates 592 would hit a top 510 of the dimple 500 and flow around the dimple 500 in multiple directions. In a non-symmetrical hemispherically shaped dimple 500, airflow 590 and particulates 592 would hit a top 510 of the shaped dimple 500 and flow around the dimple a selected direction.

The airflow 590 and particulate 592 from primary aperture 307 may directed towards a top 510 of the dimple 500. The top 510 of the dimple 500 may have a rounded shape depending upon the overall shape of the dimple 500. In an embodiment, the dimples 500 are located such that the secondary apertures 309 are located in between each dimple, as seen in FIG. 3*b*. The addition of a dimple 500 to the impingement point 594 gently forces airflow 590 and particulate 592 around the dimple 500 and towards the secondary apertures 309. The rounded shape of the dimple 500 results in less speed loss to the airflow 590 and the particulate 592 than the flat second surface 420 that was seen in FIG. 3*a*, thus particulate 592 collection at the impingement point 594 on the top 510 of each dimple 500 will be reduced and/or eliminated.

As mentioned above, after flowing over the dimple 500 located at an impingement point, some of the airflow 590 and particulate 592 will be directed towards the secondary aperture 309 but then some airflow 590 and particulate will be directed towards a dimple 500 located at the impingement flow convergence point 595. The rounded shape of the dimple 500 at the impingement flow convergence point 595 will gradually change the direction of the airflow 590 and the particulate 592 so that the airflow 590 and particulate 592 are directed towards the combustion liner 600, thus the particulate 592 and airflow 590 from a first primary aperture 307 will not have a direct head-on collision when converging with at the impingement flow convergence point 595 with the particulate 592 and airflow 590 from a second primary aperture 307 adjacent to the first primary aperture 307. The convergence of particulate 592 and airflow 590 from adjacent primary apertures 307 at the impingent flow convergence point 596 in FIG. 3*b* may be more of a glancing blow as opposed to a head-on collision, as seen in FIG. 3*a*, resulting in less speed loss to the airflow 590 and the particulate 592 at the impingement flow convergence point 595 than was seen in FIG. 3*a*. Thus, advantageously, particulate 592 collection at the impingement flow convergence point 595 will be reduced when utilizing the particulate collection mitigation system 100, as seen in FIG. 3*b*.

Additionally, as shown by the dimples 500 located at the impingement points 594 have a first height H1 and the dimples 500 located at the impingement flow convergence points 595 may have a second height H2. In an embodiment, the first height H1 may be equivalent to the second height H2. In another embodiment, the first height H1 may be different from the second height H2. In a further embodiment, the second height H2 may be greater than the first height, as seen in FIG. 3*c*. In another embodiment, the second height H2 may be greater than or equal to about 50% of the gap height H3 of the impingement cavity 390. Advantageously by having a second height H2 about equivalent to the gap height, particulate may accumulate over time in locations 598, thus channeling airflow in newly created chambers 599.

It is understood that a combustor of a gas turbine engine is used for illustrative purposes and the embodiments disclosed herein may be applicable to applications other than a combustor of a gas turbine engine.

Technical effects of embodiments of the present disclosure include utilization of dimples on a heat shield panel to maintain speed of particulates and airflow impinging upon the heat shield panel in order to reduce collection of particulate on the heat shield panel.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine component assembly, comprising:

a first component having an inner surface, an outer surface opposite the inner surface, a first primary aperture extending from the outer surface to the inner surface through the first component, and a second primary aperture extending from the outer surface to the inner surface through the first component;

a second component having a first surface and a second surface, the inner surface of the first component and the second surface of the second component defining a cooling channel therebetween in fluid communication with the first primary aperture and the second primary aperture for cooling the second surface of the second component, wherein the second component comprises a first secondary aperture extending from the first surface to the second surface through the second component and a second secondary aperture extending from the first surface to the second surface through the second component; and a plurality of raised bumps located on the second surface of the second component, the plurality of raised bumps comprising:

a first primary raised bump located at a first impingement point on the second surface, wherein the first impingement point is located opposite the first primary aperture;

a second primary raised bump located at a second impingement point on the second surface, wherein the second impingement point is located opposite the second primary aperture; and a secondary raised bump located at an impingement flow convergence point, wherein the impingement flow convergence point is located equally between the first impingement point and the second impingement point and wherein the impingement flow convergence point is not aligned with the first primary aperture or the second primary aperture in the first component, wherein the first secondary aperture is located at a bottom of a curved surface extending between the first primary raised bump and the secondary raised bump, wherein the second secondary aperture is located at a bottom of a curved surface extending between the second primary raised bump and the secondary raised bump, wherein the inner surface of the first component is flat in a first surface area from the first primary aperture to the second primary aperture, the first surface area being located opposite the secondary raised bump, the first secondary aperture, and the second secondary aperture, wherein the first primary raised bump has a first rounded top, wherein the first primary aperture is configured to direct at least one of particulate or airflow at the first rounded top, wherein the second primary raised bump has a second rounded top, and wherein the second primary aperture is configured to direct at least one of particulate or airflow at the second rounded top.

2. The gas turbine engine component assembly of claim 1, wherein each of the plurality of raised bumps has a rounded shape.

3. The gas turbine engine component assembly of claim 1, wherein each of the plurality of raised bumps has a hemispherical shape.

4. The gas turbine engine component assembly of claim 3, wherein each of the plurality of raised bumps has a symmetrical hemispherical shape.

5. The gas turbine engine component assembly of claim 3, wherein each of the plurality of raised bumps has a non-symmetrical hemispherical shape.

6. A shell of a combustor for use in a gas turbine engine, the shell comprising:

a combustion chamber of the combustor, the combustion chamber having a combustion area;

a combustion liner having an inner surface, an outer surface opposite the inner surface, a first primary aperture extending from the outer surface to the inner surface through the combustion liner, and a second primary aperture extending from the outer surface to the inner surface through the combustion liner;

a heat shield panel interposed between the inner surface of the combustion liner and a combustion area, the heat shield panel having a first surface and a second surface opposite the first surface, wherein the second surface is oriented towards the inner surface, and wherein the heat shield panel is separated from the combustion liner by an impingement cavity, wherein the heat shield panel comprises a first secondary aperture extending from the first surface to the second surface through the heat shield panel and a second secondary aperture extending from the first surface to the second surface through the heat shield panel; and a plurality of raised bumps located on the second surface, the plurality of raised bumps comprising:

a first primary raised bump located at a first impingement point on the second surface, wherein the first impingement point is located opposite the first primary aperture;

a second primary raised bump located at a second impingement point on the second surface, wherein the second impingement point is located opposite the second primary aperture; and a secondary raised bump located at an impingement flow convergence point, wherein the impingement flow convergence point is located equally between the first impingement point and the second impingement point and wherein the impingement flow convergence point is not aligned with the first primary aperture or the second primary aperture in the combustor liner, wherein the first secondary aperture is located at a bottom of a curved surface extending between the first primary raised bump and the secondary raised bump, wherein the second secondary aperture is located at a bottom of a curved surface extending between the second primary raised bump and the secondary raised bump, wherein the inner surface of the combustion liner is flat in a first surface area from the first primary aperture to the second primary aperture, the first surface area being located opposite the secondary raised bump, the first secondary aperture, and the second secondary aperture, wherein the first primary raised bump has a first rounded top, wherein the first primary aperture is configured to direct at least one of particulate or airflow at the first rounded top, wherein the second primary raised bump has a second rounded top, and wherein the second primary aperture is configured to direct at least one of particulate or airflow at the second rounded top.

7. The shell of claim 6, wherein each of the plurality of raised bumps has a rounded shape.

8. The shell of claim 6, wherein each of the plurality of raised bumps has a hemispherical shape.

9. The shell of claim 8, wherein each of the plurality of raised bumps has a symmetrical hemispherical shape.

10. The shell of claim 8, wherein each of the plurality of raised bumps has a non-symmetrical hemispherical shape.

* * * * *